March 7, 1939.  A. AHLER  2,149,262
CLUTCH CONTROL
Filed Feb. 23, 1938
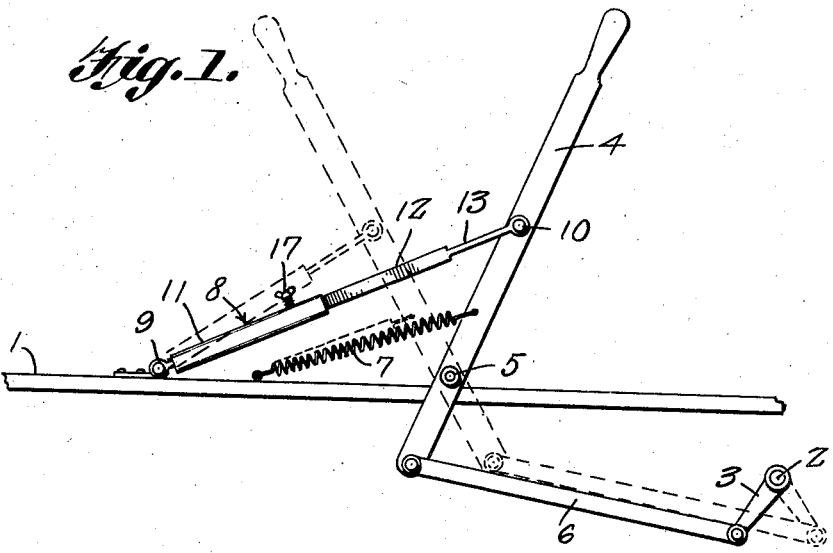
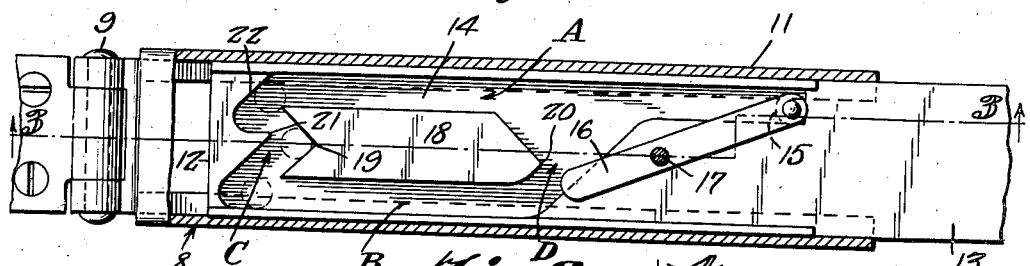
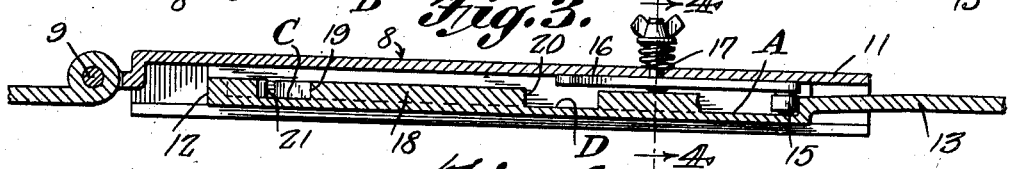
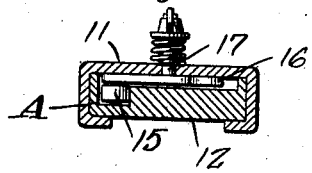
Anthony Ahler,
INVENTOR
BY Victor J. Evans & Co.
ATTORNEYS
P. J. Hickey
WITNESS Patented Mar. 7, 1939

2,149,262

UNITED STATES PATENT OFFICE 2,149,262

CLUTCH CONTROL

Anthony Ahler, Lyons, Wis.

Application February 23, 1938, Serial No. 192,141

1 Claim. (Cl. 74—541)

This invention relates to clutch controls for tractors or similar devices and has for the primary object the provision of a device of this character which may be readily installed on a tractor in lieu of the usual clutch pedal to permit actuation of the clutch by hand through the movement of the lever and which may be operated from a remote place such as on the implement drawn by the tractor through the use of a pull rope attached to said lever, and device including means for sustaining the clutch declutched or disengaged and may be actuated to free said clutch for engagement through a limited movement of the lever in the same direction employed for the declutching of the clutch.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a fragmentary side elevation illustrating a clutch control constructed in accordance with my invention.

Figure 2 is a fragmentary horizontal sectional view showing a part of the clutch control.

Figure 3 is a longitudinal sectional view taken on line 3—3 of Figure 2.

Figure 4 is a transverse sectional view taken on line 4—4 of Figure 3.

Referring in detail to the drawing, the numeral 1 indicates a fragmentary portion of a platform of a tractor or similar device, and the numeral 2 indicates the clutch operating shaft including the usual arm 3. It is customary to operate the clutch shaft 2 through a foot pedal. However, to permit remote control of the clutch shaft the present invention is employed and consists of a hand lever 4 pivotally mounted on the platform 1, as shown at 5, and is connected to the arm 3 by a link 6. A coil spring 7 is connected to the lever 4 and to the platform 1 acting to urge the lever normally into a position for the engagement of the clutch, as shown in dotted lines in Figure 1. To declutch the clutch the lever 4 is moved into the full line position as shown in Figure 1. To permit operation of the lever 4 remotely therefrom, a pull rope (not shown) is attached to said lever adjacent the hand grip thereof and this pull rope extends onto the implement drawn by the tractor. A pull made on the lever by the rope will move said lever from the dotted line position to the full line position bringing about declutching of the clutch of the tractor. In order that the lever 4 be held in full line position or in the position of declutching the clutch, a sustaining device 8 is hinged on the platform 1, as shown at 9, and pivoted on the lever 4, as shown at 10. The sustaining device consists of an elongated casing 11 carrying the hinge 9 and slidably receives therein a plate 12 which includes a reduced portion 13 connected to the lever 4 by the pivot 10. The plate 12 has formed therein a groove 14 to receive a roller 15 on the end of an arm 16. The arm is pivoted on the casing 11, as shown at 17. The pivot 17 consists of a bolt carried by the arm and extending through an opening in the casing and having turned thereon a wing nut. A coil spring is located between the nut and the casing for establishing frictional contact of the arm with the casing.

The groove 14 includes a run A extending longitudinally thereof and a run B also extending longitudinally thereof and of a shorter length than the run A. Between the runs A and B is a stop 18 having a V-shaped notch 19 in one end and its opposite end beveled to provide a projection 20. The runs A and B are connected at one end by a run C and one end of the run B is connected to the run A by a run D. One wall of the run C is provided with a projection 21 disposed opposite the V-shaped notch 19 in the stop 18. One of the bevels of the stop 18 acts as one of the walls of the run D.

Normally when the clutch is engaged or the lever 4 is in the dotted line position, as shown in Figure 1, the plate 12 is moved to its fullest extent within the casing with the roller 15 occupying a position at one end of the run A. When the lever 4 is moved into the position to declutch the clutch or the full line position, as shown in Figure 1, the plate 12 slides outwardly relative to the casing with the roller moving along the run A until it engages the guide wall 22 of the run C and is caused to enter said run C and be directed into the notch 19 of the stop 18 by the projection 21. As the roller enters the notch 19 the lever 4 assumes a position to declutch or disengage the clutch. The roller entering the notch 19 of the stop prevents the lever 4 from returning to clutching position or dotted line position, as shown in Figure 7, consequently holding the clutch disengaged. To again engage the clutch a movement of the lever 4 is made in the same direction as when moving from its dotted line position to its full line position only a limited distance beyond that shown in full lines in Figure 1. This limited movement of the lever 4 causes a limited sliding movement of the plate 12 bringing about a movement of the roller from the notch 19 into the run B. As the roller enters the run B the spring 7 may act then to move the lever into clutch engaging position or into the dotted line position, as shown in Figure 1. During this movement of the lever 4 the roller travels in the run B and enters the run D and passes therefrom into the run A assuming the position as shown by the roller in Figure 2. The arrows in Figure 2 indicate the movement of the roller in the runs of the groove 14 as heretofore described.

What is claimed is:

A clutch control comprising a pivotally mounted hand lever connected with an operating shaft of a clutch, a spring connected to said lever for normally urging the latter into a position for the engagement of the clutch requiring manual operation of the lever into a second position for the declutching of the clutch, a casing mounted for hinging movement, a plate slidable in said casing and pivotally connected on said lever and having a groove including a pair of longitudinally arranged runs and a pair of connecting runs establishing communication between said longitudinally extending runs, a stop on said plate located between the longitudinally extending runs and the connecting runs and having a V-shaped notch, an arm pivoted on said casing, and a roller carried by said arm for operating in the runs of the grooves and adapted to enter the V-shaped notch on the lever assuming its second named position to retain the clutch disengaged.

ANTHONY AHLER.